(12) United States Patent
Kennedy, III (10) Patent No.: US 9,114,282 B2
(45) Date of Patent: Aug. 25, 2015

(54) GAME BALL OR OTHER ARTICLE OF SPORTS EQUIPMENT PRINTED WITH VISIBLE LIGHT-CURABLE INK AND METHOD

(71) Applicant: NIKE, Inc., Beaverton, OR (US)

(72) Inventor: Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 28 days.

(21) Appl. No.: 13/903,715

(22) Filed: May 28, 2013

(65) Prior Publication Data

US 2013/0324326 A1    Dec. 5, 2013

Related U.S. Application Data

(63) Continuation-in-part of application No. 13/483,447, filed on May 30, 2012.

(51) Int. Cl.
| | |
|---|---|
| *A63B 37/12* | (2006.01) |
| *A63B 37/00* | (2006.01) |
| *A63B 45/02* | (2006.01) |
| *B41F 17/00* | (2006.01) |
| *B41F 17/30* | (2006.01) |
| *B41F 17/34* | (2006.01) |
| *A63B 59/00* | (2015.01) |
| *A63B 71/06* | (2006.01) |

(52) U.S. Cl.
CPC ............. *A63B 37/0022* (2013.01); *A63B 45/02* (2013.01); *B41F 17/001* (2013.01); *B41F 17/30* (2013.01); *B41F 17/34* (2013.01); *A63B 59/00* (2013.01); *A63B 2071/0694* (2013.01)

(58) Field of Classification Search
CPC .................................................... A63B 37/0022
USPC .................................................. 473/409, 378
See application file for complete search history.

(56) References Cited

U.S. PATENT DOCUMENTS

| | | | |
|---|---|---|---|
| 4,889,792 | A | 12/1989 | Palazzotto |
| 5,545,676 | A | 8/1996 | Palazzotto et al. |
| 5,770,325 | A | 6/1998 | Keller et al. |
| 5,876,805 | A | 3/1999 | Ostlie |

(Continued)

FOREIGN PATENT DOCUMENTS

WO        2005097925 A1    10/2005

OTHER PUBLICATIONS

Spectra Group Limited, Inc., Photoscience Solutions, Brochure, pp. 1-4.

(Continued)

*Primary Examiner* — Raeann Gorden
(74) *Attorney, Agent, or Firm* — Honigman Miller Schwartz and Cohn LLP; Anna M. Budde; Jonathan P. O'Brien (57) ABSTRACT

Sports equipment, particularly game balls, are printed with an ink cured with light in the visible region of the electromagnetic spectrum. The ink uses a photoinitiator that absorbs light in both the ultraviolet region and in a range of from about 400 nm to about 690 nm in the visible light region, a Type I photoinitiator compound absorbing in only the visible region, or a Type II photoinitiator compound either containing an abstractable hydrogen or used with a free radical-curable material comprising an abstractable hydrogen.

9 Claims, 3 Drawing Sheets

(56) References Cited

U.S. PATENT DOCUMENTS

| | | | |
|---|---|---|---|
| 5,889,084 | A | 3/1999 | Roth |
| 6,013,330 | A | 1/2000 | Lutz |
| 6,017,660 | A | 1/2000 | Palazzotto et al. |
| 6,248,804 | B1 | 6/2001 | Lutz |
| 7,048,651 | B2 | 5/2006 | Kennedy, III et al. |
| 7,448,323 | B2 | 11/2008 | Kennedy, III et al. |
| 7,579,386 | B1 | 8/2009 | Matroni et al. |
| 7,591,743 | B2 | 9/2009 | Kennedy, III |
| 7,731,608 | B2 | 6/2010 | Kennedy, III |
| 7,750,061 | B2 | 7/2010 | Matroni et al. |
| 7,765,931 | B2 | 8/2010 | Kennedy, III et al. |
| 7,846,988 | B2 | 12/2010 | Matroni et al. |
| 2002/0086161 | A1 | 7/2002 | Smetana et al. |
| 2002/0132871 | A1 | 9/2002 | Colton et al. |
| 2005/0132909 | A1* | 6/2005 | Lutz .............................. 101/41 |
| 2010/0160475 | A1 | 6/2010 | Stizmann et al. |
| 2012/0270963 | A1 | 10/2012 | Suzumura et al. |
| 2013/0059940 | A1 | 3/2013 | Nielsen et al. |
| 2014/0315002 | A1* | 10/2014 | Gaudl et al. ............... 428/195.1 |

OTHER PUBLICATIONS

Grabowski, Vogelhuber, Sabol, Chen, Mcleod, Sheridan, Absorption and Bleaching Dynamics of Initiator in Thick Photopolymer Exposed to Gaussian Illumination, Organic 3D Photonics Materials and Devices II, 2008, Proc. of SPIE vol. 7053, 7053D.

Arikawa, Takahishi, Kanie, Ban, Effect of Various Visible Light Photoinitiators on the Polymerization and Color of Light-Activated Resins, Dental Materials Journal, 2009, 454-460, 28(4).

Arsu, Aydin, Yagci, Jockusch, Turro, One Component Thioxanthone Based Type II Photoinitiators, Photochemistry and UV Curing: New Trends, 2006, 1-13, Research Signpost, Kerala, India.

Teshima, Nomura, Tanaka, Urabe, Okazaki, Nahara, ESR Study of Camphorquinone/Amine Photoiniator Systems using Blue Light-Emitting Diods, Biomaterials, 2003, 2097-2103.

Notification of Transmittal of the International Search Report and the Written Opinion of the International Searching Authority in connection with International Patent Application No. PCT/US2013/043053 mailed on May 29, 2013; 11 pages.

* cited by examiner

GAME BALL OR OTHER ARTICLE OF SPORTS EQUIPMENT PRINTED WITH VISIBLE LIGHT-CURABLE INK AND METHOD

BACKGROUND

The present disclosure generally relates to sports substrates marked with indicia, particularly to those that are subject to impact during play, and to methods of preparing such marked sports substrates, particularly game balls, by an ink that is printed and cured.

Inks curable with ultraviolet light ("UV") are quick-curing inks useful in continuous-type processes in which subsequent treatment of an ink-printed substrate is involved. A number of UV-curable inks are known. Typical UV-curable inks comprise acrylate- or methacrylate-functional resins, oligomers, and monomers along with a photoinitiator component that absorbs in the ultraviolet region of light. Using UV-curable ink for applying indicia to a game ball has been described, for example in Keller et al., U.S. Pat. No. 5,770,325 and Lutz, U.S. Pat. No. 6,013,330. Curing with UV light is a less than satisfactory process in that the cost of bulbs is high and their operation is energy-intensive. Further, ozone is typically generated, which presents a potential regulatory issue.

Lutz, U.S. Pat. No. 6,248,804, teaches when a combination of UV and visible light photoinitiators or when photoinitiators having an absorbance spectrum in both the UV and visible light regions are used in an ink printed on a game ball such as a golf ball, the ink is cured using both UV and visible light. This is said to ensure through-cure of the ink. However, the process has all the shortcomings of a solely UV-curing process with the additional complexity and expense of adding visible light curing.

There exists a need for a highly durable ink curable with visible light for printing indicia on surfaces of sports equipment such as a curved and dimpled surface of a golf ball, and which provides an image having good durability on a substrate subject to impact during play.

SUMMARY

A game ball, such as a golf ball, or other article of sports equipment is printed with an indicium by an ink cured with visible light having a wavelength of from about 400 nm to about 690 nm. The ink may be applied by any appropriate printing method, for example by pad transfer printing. The ink includes a free radical-curable material, a colorant, and a photoinitiating component selected from compounds that absorb light in the visible light region of the electromagnetic spectrum to generate free radicals. A free radical-curable material is one for which cure (by addition polymerization of the material) is initiated by free radicals. The ink is preferably cured with visible light radiation from an LED (light-emitting diode). The printed indicium on the game ball or other article of sports equipment preferably has good impact resistance, has good adhesion to the surface on which it is printed, and is durable.

In one aspect, the ink includes a photoinitiating component selected from compounds that absorb light in both the ultraviolet region and in a range of from about 400 nm to about 690 nm in the visible light region of the electromagnetic spectrum to generate free radicals.

In another aspect, the ink includes a photoinitiating component selected from Type I photoinitiators and Type II photoinitiator compounds containing abstractable hydrogens. In particular embodiments, these inks are free from amine compounds.

In another aspect of the disclosed technology, a method of printing an indicium on the game ball or other article of sports equipment includes printing the indicium with an ink having a photoinitiating component selected from compounds that absorb in both the ultraviolet region of the electromagnetic spectrum and from about 400 nm to about 690 nm in the visible light region of the electromagnetic spectrum to generate free radicals and curing the printed indicium with visible light including radiation in the 400 nm to 690 nm region. The printing may be done by pad printing. Also provided is the game ball or other article of sport equipment printed by the method.

Marking game balls or other sports equipment with visible light-curing ink and curing the ink with radiation in the visible light region of the electromagnetic spectrum offers several advantages over inks that are cured at least in part with UV light. Irradiation with UV light creates ozone and heat that must be removed from the workplace. Further, the UV light itself is intense and is subject to regulation in the workplace, including shields to ensure that the UV irradiation does not cause injury. Also, it is periodically necessary to check the strength and wavelength of UV irradiation by passing a calibration-checking device through the UV irradiation, thus disrupting production. As the UV lamp ages, it becomes necessary to adjust the curing process to change in the strength or wavelength from the lamp. UV bulbs often need replacement. In contradistinction, visible light generated from diodes seldom needs calibration, does not produce as much heat, and does not generate ozone. Additionally, the diodes have a long service life.

Processing also can be more flexible when using visible-light curing because visible light will pass through many clear top coatings, which typically contain UV absorbers, UV stabilizers, and optical brighteners, all of which absorb UV energy, without adversely affecting the coating and without significant loss of curing energy. This enables a manufacturer to apply an indicium and apply a clear, non-absorbing topcoat over the indicium. In this way, the indicium can be cured or finish being cured through a clear top coat after the top coat is applied.

"Indicium" refers to a printed number, mark, design, image, character, text, graphic, pattern, or any combinations of these, which may be monochromatic, polychromatic, black and white, or full-color. "(Meth)acrylic" is used as an abbreviation for "methacrylic or acrylic"; correspondingly, "(meth)acrylate" is used as an abbreviation for "methacylate or acrylate," "(meth)acrylated" is used as an abbreviation for "methacylated or acrylated," and "poly(meth)acrylate" is used as an abbreviation for "polymethacrylate or polyacrylate."

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. As used in this specification, the term "or" includes any and all combinations of one or more of the listed items.

It should be understood that the description and specific examples are intended for purposes of illustration only and are not intended to limit the scope of the claims.

BRIEF DESCRIPTION OF THE DRAWINGS

The drawings illustrate some aspects of the disclosed technology. The components in the figures are not necessarily to scale, emphasis instead being placed upon illustrating the principles of the invention. Like reference numerals designate corresponding parts throughout the different views.

DETAILED DESCRIPTION

A detailed description of exemplary, nonlimiting embodiments follows.

An ink curable with visible light includes a free radical-curable material, a colorant, and a photoinitiating component selected from compounds that absorb light in the visible light region of the electromagnetic spectrum to generate free radicals. The ink may preferably be suited for application by pad transfer when it will be printed on a surface that is not flat. Also, the cured ink may preferably be formulated to have good impact resistance, making it suitable for use on items in rough service, such as game balls and other articles of sports equipment that are subjected to repeated impacts during play. In various embodiments, the ink is printed on a game ball, and particularly on a golf ball, then cured with visible light including a wavelength in the region of from about 400 nm to about 690 nm.

The free radical-curable material typically includes a resin having a plurality of free radical-curable groups. The term "resin" as used includes both polymers and oligomers. Suitable free radical-curable groups include various ethylenically unsaturated groups, for example (meth)acrylate groups, ethacrylate groups, crotonate groups, vinyl ether groups, vinyl ester groups, and allyl groups such as allyl ether groups and allyl ester groups. Nonlimiting examples of suitable resins include (meth)acrylate-functional acrylic or vinyl copolymers, polyether(meth)acrylates, epoxy(meth)acrylates, urethane(meth)acrylates, elastomeric(meth)acrylates such as (meth)acrylated polyester- and polyether-based polyurethanes, unsaturated polyesters including (meth)acrylated polyesters and polyesters prepared with unsaturated monomers such as maleic anhydride or fumaric acid, dendritic (meth)acrylates, polybutadiene(meth)acrylates, and the corresponding vinyl ethers and vinyl esters of these (meth)acrylate resins.

Specific examples of suitable resins having a plurality of free radical-curable groups include polymethacrylates such as bisphenol A ethoxylate dimethacrylate; any of the reaction products of ethylenically unsaturated alcohols such as hydroxyalkyl(meth)acrylates and allyl alcohol with isocyanate-functional resins; and trifunctional aliphatic polyester urethane acrylates. Examples of isocyanate-functional resins that can be reacted with the ethylenically unsaturated alcohols to make a resins having a plurality of free radical-curable groups include oligomers of diisocyanates such as hexamethylene diisocyanate and isophorone diisocyanate, isocyanate-functional acrylic polymers (for example, copolymers of isocyanatoethyl methacrylate or α,α-dimethyl meta-isopropenyl benzyl isocyanate) and isocyanate-functional polyurethanes (e.g., isocyanate-functional reaction products of polyols such as polyethylene glycol, polypropylene glycol, glycerol, or trimethylolpropane and their ethoxylated, propoxylated and polycaprolactone analogs with diisocyanates such as hexamethylene diisocyanate or isophorone diisocyanate). Suitable free radical-curable resins are commercially available, for example from Cytec Industries (Woodland Park, N.J.) under the trademark EBECRYL® and UCECOAT®, from Sartomer USA LLC (Exton, Pa.), from Bayer Material Science Corporation (Pittsburgh, Pa.) under the trademark Desmolux®, and from BASF Corporation (Wyandotte, Mich.) under the trademark Laromer®.

The resin having a plurality of free radical-curable groups may be of any suitable molecular weight for the selected method of applying the ink. The number average molecular weight may desirably range from about 1,000 to about 10,000, preferably from about 1,000 to about 8,000, more preferably from about 1,000 to about 5,000, and most preferably from about 1,200 to about 3,000. Blends of different resins can be used.

The free radical-curable material may typically include from about 30 wt percent to 100 wt percent of the resin having a plurality of free radical-curable groups. In various embodiments, the free radical-curable material contains from about 40 wt % or from about 50 wt % or from about 60 wt % or from about 70 wt % up to about 75 wt % or up to about 80 wt % or up to about 90 wt % or up to about 99 wt % or up to 100 wt % of the resin having a plurality of free radical-curable groups. Among typical ranges that may be selected from those disclosed here are from about 50 wt % to 100 wt % and from about 70 wt % to about 100 wt % of the resin having a plurality of free radical-curable groups based on the total weight of free radical-curable material in the ink composition.

The balance of free radical-curable material that is not a resin is one or more ethylenically unsaturated monomers. A free radical-curable monomer can be, for example, a monofunctional, difunctional, or multifunctional (meth)acrylate, vinyl ester, or vinyl ether. Nonlimiting examples of suitable monomers include mono(meth)acrylate monomers such as stearyl(meth)acrylate, tetrahydrofurfuryl(meth)acrylate, isobornyl(meth)acrylate, 2-tert-butyl cyclohexyl(meth)acrylate, 4-tert-butyl cyclohexyl(meth)acrylate, and isodecyl (meth)acrylate; poly(meth)acrylates such as 1,6-hexanediol di(meth)acrylate, butanediol di(meth)acrylate, tripropylene glycol di(meth)acrylate, tetraethylene glycol di(meth)acrylate, ethylene glycol di(meth)acrylate, diethyleneglycol di(meth)acrylate, trimethylolpropane mono-, di- or tri(meth) acrylates, pentaerythritol mono-, di-, tri- or tetra(meth)acrylates, and 2,2-bis-4-(2-hydroxy-3-methacryloyloxy)phenyl-propane; and vinyl monomers such as styrene, vinyl ethers such as butyl vinyl ether, and vinyl esters such as vinyl acetate.

Embodiments of the ink composition may typically contain between about 1 wt percent to about 60 wt percent monomer, more typically between about 10 wt percent and about 50 wt percent monomer, and most typically between about 10 wt percent and about 30 wt percent monomer, based on the total weight of free radical-curable materials in the ink composition.

The free radical-curable material provides the ink with properties and characteristics, particularly adhesion, flexibility, and impact resistance, sufficient to withstand the conditions to which the printed game ball or other sports article is to be subjected. For example, the resin may be chosen to impart to the cured ink more flexibility than is inherent in an underlying substrate such as a golf ball, a golf club, or hockey stick. In this way, the indicium can flex at least as much as the substrate and is less likely to be dislodged from the substrate. The resin may have one or more functional groups that promote adhesion to the substrate, such as acid groups. Adhesion of the indicium to the printed golf ball is tested by loading 10 of the printed golf balls into a porcelain jar with an equal mixture of sand and water occupying about 20% of the volume of the porcelain jar. The golf balls are tumbled in the jar for 8 hours on a ball mill, then removed and evaluated for adhesion of the indicium. At least about 50 percent, preferably at least about 70 percent, and most preferably at least about 80 percent of the surface area of the indicium, remains. An adhesion of at least about 50 percent of the indicium after this test is considered to render the surface suitable for use in competitive play.

The ink further includes a photoinitiator that is selected from compounds that absorb radiation at least in the visible light region of the electromagnetic spectrum to generate free radicals.

There exist two general classes or types of visible light-active photoinitiators. Typically, these two types are known as Type I ("α-cleavage") initiators and Type II ("hydrogen-abstraction") initiators.

Nonlimiting examples of suitable Type I photoinitiators that are photochemically active in the 400 nm to 690 nm region of the electromagnetic spectrum include bisacylphosphine oxides such as bis(2,4,6-trimethylbenzoyl)phenylphosphine oxide, oxime sulfonates such as Irgacure® PAG 103, Irgacure® PAG 121, Irgacure® CGI 1380, mono- and di-benzoyl germane compounds such as benzoyltrimethylgermane, dibenzoyldiethylgermane and bis-germyl ketones, organoborates, and blends of diphenyl(2,4,6-trimethylbenzoyl)phosphine oxide and 2-hydroxy-2-methylpropiophenone such as the 50/50 blend by weight of diphenyl(2,4,6-trimethylbenzoyl)phosphine oxide and 2-hydroxy-2-methylpropiophenone available from BASF Corporation as Darocur® 4265.

Type II initiators are more typically used with visible light photoinitiation, particularly in the visible light spectral region adjacent UV light. Type II photoinitiators may be selected from benzophenones and benzophenone derivatives, thioxanthones (TX) and their thiol and carboxylic acid derivatives, benzil, quinones, anthraquinones, ketocoumarins, and some 1,2-diketones. Nonlimiting examples of suitable Type II photoinitiators that are photochemically active in the 400 nm to 690 nm region of the electromagnetic spectrum include thioxanthen-9-one, isopropylthioxanthone, camphorquinone, phenanthrenequinone, 1-phenyl-1,2-propanedione, 2-(2-chlorophenyl)-1-[2-chlorophenyl)-4,5-diphenyl-2H-imidazoyl-2-yl]-4,5-diphenyl-1H-imidazole, benzophenones such as 4,4'-bis(diethylamino)benzophenone, 4,4'-bis(dimethylamino)benzophenone, and 4-(dimethylamino)benzophenone, 9-(2-morpholine-4yl-acetyl)-5-thia-naphthasen-12-one (TX-MPM), 7-ethylthiochromeno[2,3-b]carbazol-13 (7H)-one, thioxanthone-ethylcarbazole), bis(η5-2,4-cyclopentadien-1-yl)-bis(2,6-difluoro-3-(1H-pyrrol-1-yl)-phenyl)titanium, and 2-chlorothioxanthen-9-one.

Type II initiators require a hydrogen donor. For example secondary or tertiary alcohols, ethers, amines, and thiols often are used as hydrogen donors. In particular, TX derivatives, in conjunction with tertiary amines, are efficient photoinitiators with absorption characteristics that compare favorably with benzophenones. Example amines that can be used for the purpose include tertiary amines such as N,N-dimethyl-p-toluidine; ethyl-dimethylamino benzoate; dihydroxyethyl-p-toluidine; and triethylamine. Aliphatic alcohols and amine are preferred for better color development of the ink. Generally, the hydrogen donor compound may be included in amounts of up to about 10 wt % based on the total weight of the Type II initiator.

Such a "co-initiator" is not necessary when sufficient hydrogen abstraction may be obtained from a group of the visible light Type II photoinitiator itself. Eliminating the co-initiator not only saves formulation cost but also may allow the ink to have better color when cured because the amines commonly used to supply abstractable hydrogens are not needed. Examples of Type II photoinitiators that may be used without a "co-initiator" to supply abstractable hydrogens include 2-mercaptothiosanthone (TX-SH) and 9-(2-morpholine-4-yl-acetyl)-5-thia-naphthasen-12-one (TXMPM). A TX-based photoinitiator having an anthracene group, 5-thia-pentacene-14-one also does not require an additional hydrogen donor for free radical formation. A "co-initiator" is also not needed if a component of the free radical-curable material can provide a hydrogen, for example because it contains an amine group, as does 2-(N,N-dimethylamino)ethyl methacrylate, or an allylic hydrogen. Suitable examples of free radical-curable materials having allylic hydrogens or include allyl monomers, of which allyl methacrylate and diallyl ether may particularly be mentioned. A number of suitable examples of such free radical-curable materials are described in Blum et al, U.S. Pat. No. 6,133,337. In other embodiments, camphorquinone, which has a peak absorbance at 470 nm, can also initiate, albeit slowly, free radical polymerization under blue light without a co-initiator.

In various embodiments, the photoinitiating component is selected from compounds that absorb radiation in both the ultraviolet region and in a range of from about 400 nm to about 690 nm in the visible light region of the electromagnetic spectrum to generate free radicals. The ink is cured only with radiation in the visible light region of the electromagnetic spectrum.

Blends of different photoinitiators can be used. The ink composition typically contains from about 0.5 wt percent to about 15 wt percent photoinitiator, or from about 3 wt percent and about 13 wt percent, or from about 5 wt percent to about 12 weight percent photoinitiator based on the total weight of free radical-curable materials in the ink composition. The amount of photoinitiator component used in relation to the amount of free radical-curable materials in the ink depends upon the particular photoinitiator or photoinitiators used as well as the particular free radical-curable materials used and the desired rate of cure, and the amounts may be optimized in a straightforward manner to suit the particular use. Type I photoinitiators are typically used in higher amounts than are Type II photoinitiators. Type II photoinitiators are typically used in amounts of from about 0.5 wt % to about 7 wt. % based on the amount of free radical-curable material.

The ink also includes a colorant, which may be selected from pigments, dyes, and combinations of these. The ink may, for example, contain one or more pigments to provide a desired color. Suitable pigments include, without limitation, inorganic pigments such as carbon black, titanium dioxide, black iron oxide, and so on; and organic pigments such as azo pigments such as lithol reds (e.g., calcium lithol red, barium lithol red), rubine reds, and naphthol reds, oranges, and browns; monoarylide and diarylide pigments such as diarylide yellow, phthalocyanine blue and green pigments, azomethine pigments, methine pigments, anthraquinone pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments such as carbazole violet, benzimidazolone yellows, tolyl orange, naphthol orange, and quinophthalone pigments. and so on. Examples of suitable dyes include azo dyes such as monoazo and disazo, metal complex salt dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, naphthalimide dyes, perinone dyes, phthalocyanine dyes, and triarylmethane dyes. The colorants may be used singly or in any combination.

Solid pigments are typically pre-dispersed before being incorporated into the ink, for example in liquid monomer or resin. Carbon black and iron oxide black are non-limiting examples of suitable pigments for making black inks. The colorant may be included in the ink composition in amounts of generally from about 2 to about 100 parts by weight based on 100 parts by weight of the total weight of free radical-curable materials in the ink composition. The amount of colorant included in the ink depends largely on the particular pigment and the desired color strength for the ink.

The ink is formulated to have a viscosity suitable for the printing method by which it will be applied. To facilitate pad transfer, in embodiments of the disclosure, the ink composition has a viscosity of between about 50 centipoise and about 15,000 centipoise, typically between about 100 centipoise and about 10,000 centipoise, and more typically between about 500 centipoise and about 3,000 centipoise at the time of application, with the viscosity being determined using a Brookfield viscometer model RVT equipped with a #2 spindle at 30 rpm with the sample at 25° C. (standard temperature and pressure conditions).

Typically, free radical-curable monomer is used to adjust viscosity, but organic solvent such as toluene, xylene, methyl ethyl ketone, butyl acetate, and so on or water (in the case of water-soluble or water-dispersible free-radical curable material) may also be used. In embodiments in which a solvent is used, the solvent typically is a liquid with a fast to moderate evaporation rate so that the ink composition becomes tacky fairly quickly to promote transfer from the ink pad onto the substrate being printed. When solvent is used, the photoinitiator may be introduced into the ink composition as a solution in an organic solvent. When solvent is used, the ink composition typically includes about 1 wt percent to about 30 wt percent solvent, more typically about 5 wt percent to about 20 wt percent solvent, and most typically about 8 wt percent to about 10 wt percent solvent, based on the weight of the ink composition. More or less solvent may be needed depending on the oil absorption characteristics of the pigments.

The ink may contain any desired additives known in the art. Illustrative examples of additives include, without limitation, surfactants, wetting agents, waxes, emulsifying agents and dispersing agents, antioxidants, flow agents and other rheology modifiers, and anti-settling agents. The surface tension of the ink composition affects pad transfer. The surface tension of the ink composition should not be substantially higher than the surface tension of the substrate upon which it is printed. In selected embodiments, wetting agents can be added if necessary to prevent beading of the ink composition upon application to the substrate, such as upon the surface of a golf ball. Suitable wetting agents include, but are not limited to, silicon surfactants and fluorocarbon surfactants. The ink composition typically includes up to about 2 wt percent wetting agent, based on the weight of the ink composition. Other additives that do not adversely affect the pad transfer and impact resistance of the ink composition also can be incorporated into the ink composition. When included, additives are typically included in amounts of from about 0.001% to about 7% by weight of the ink composition.

The ink may be printed on a golf ball and cured with visible light in the following way. The photoinitiator can be dissolved in a monomer or solvent, then mixed with resin and pigment (dispersed in resin or monomer) or dye. The mixture may then be placed in an open or closed cup dispenser of a pad printing device. The ink is then applied by pad printing as an indicium to a substrate, such as a game ball and in particular a golf ball, then the applied ink is cured by exposure to visible light at a wavelength that is absorbed by the photoinitiator to form a cured indicium. The visible light is preferably provided by one or more LED lights that emit visible light having a wavelength absorbed by the photoinitiator. In some embodiments of the disclosure, the pad to be used for transfer of the ink composition typically contains silicone. This type of pad has good elasticity, durability, and softness and an appropriate surface tension. Other types of pads also can be used.

Other printing methods, such as screen printing, gravure printing, or ink jet printing, can be used to apply the ink to a surface of an article of sports equipment. The ink composition and its viscosity are adjusted to suit the application method.

The step of curing with visible light typically may include placing the indicium under a visible light LED at conditions of lamp intensity, light wavelength, lamp distance, and time sufficient to cure of the ink to a desired extent, preferably to fully cure the ink. The light can be directed at the surface of the ball directly or by way of a suitable reflector, such as a parabolic reflector, which can be used to intensify the light on the indicium. The LED is selected to emit light at least at a particular wavelength or wavelength at which the photoinitiator absorbs light in the visible region of the electromagnetic spectrum. In various embodiments, the cured ink may have a Sward hardness (ASTM D 2134-66) of no more than about 40. Optionally a clear top coat coating is applied over the cured ink indicium. The indicium has impact resistance sufficient to render the game ball suitable for use in competitive play.

The ink composition can be used for printing indicia on various substrates, such as game balls, such as golf balls, softballs, baseballs, and other game balls. Other sports-related substrates include, but are not limited to, bats such as a baseball or cricket bat, and sticks such as field hockey sticks and lacrosse sticks. The ink composition also can be used on substrates formed from ionomeric addition polymers, polybutadiene, synthetic leathers based on polyurethane or polyvinyl chloride, and other substrates.

The viscosity of the ink composition affects the thickness of the indicium on the cover. The indicium has a thickness of less than about 100 micrometers, typically about 10 micrometers to about 40 micrometers, more typically about 13 micrometers to about 30 micrometers, and most typically about 20 micrometers to about 25 micrometers.

The conditions of visible light exposure that are appropriate to cure the ink composition and can be ascertained by one having ordinary skill in the art. For example, the golf ball may pass through a visible light treatment apparatus at a distance of about 1¼ inches to about 1¾ inches from a visible light source which has an intensity of at least about 500 mW/cm$^2$, more typically between about 750 mW/cm$^2$ and about 1000 mW/cm$^2$, at a rate to expose the printed indicia to visible light radiation generally for about 0.5 second to 5 minutes. Higher and lower visible light intensities may be used as long as the cured ink meets the applicable durability requirements. The ink composition is sufficiently cured prior to application of any top coat to avoid smudging or lifting of the print when the top coat is applied.

In some embodiments of the disclosure, the ink composition can be applied on a non-light-labile surface of a substrate, such as a game ball. In accordance with the disclosure, it is generally not necessary to pretreat the surface prior to application of the ink composition. If it is desired to apply the ink composition curable with visible light on an extremely smooth surface upon which transfer is poor, the portion of the surface to be stamped can be chemically or physically etched or abraded to provide an ink-receptive surface.

The wavelength range for the light used to cure the printed ink may be between about 400 nm and about 690 nm. The visible light having a wavelength in this range can be generated by metal halide bulbs, mercury bulbs, and LEDs, for example.

Embodiments of the disclosure typically employ LEDs because the wavelength range is narrow. For example, the Blue Wave® LED Visible Light Spot Curing System is available in the United States from DYMAX Corporation, Connecticut, USA and worldwide at other DYMAX companies in Germany, China, and Hong Kong. LEDs are also available from LUMEX, Inc. Palantine and other companies. This system generates light using an array of surface-mounted LEDs. Using LED lights saves electricity and operating costs as compared with a system using traditional bulbs. Not only do LED lights have a narrow wavelength band centered at particular wavelengths, but also there is no warm-up period and there are no bulbs to change. Further, LED light has constant intensity. The system provides a maximum visible intensity of greater than about 3000 mW/cm$^2$, and intensity can be adjusted.

In embodiments of the disclosure, the intensity typically is between about 500 mW/cm$^2$ and about 3000 mW/cm$^2$, more typically between about 750 mW/cm$^2$ and about 1000 mW/cm$^2$.

Use of visible light for curing not only lowers power consumption compared to UV curing, but also does not generate ozone as is typically generated with UV curing.

The printed, cured ink preferably has a Sward hardness (determined according to ASTM D 2134) of no more than about 40 and has adhesive properties sufficient to render it suitable for use on a game ball to be used in competitive play. The ink has a Sward hardness after curing of no more than 40, more typically no more than 20. The ink cured with visible light of the disclosure provides for durability sufficient to meet stringent durability standards required for commercial grade golf balls.

The cured ink should be sufficiently flexible that it exhibits good impact resistance.

A top coat may typically be applied over the indicia to protect the indicia and to provide a glossy finish to the ball. As a non-limiting example, the ink can be used in conjunction with a two-component polyurethane top coat, such as a top coat based on polyester or acrylic polyols and aliphatic polyisocyanates, for example as hexamethylene diisocyanate or isophorone diisocyanate oligomers.

The adhesion between the ink and the top coat and/or substrate should be sufficiently strong so that both the indicia and the top coat covering it remain substantially intact when the game ball is used. Standards for image retention vary depending upon the intended use of the game ball and the degree and frequency of impact that the image is required to withstand. Adhesion of the top coat and indicium to the printed golf ball is tested by loading 10 of the printed golf balls into a porcelain jar with an equal mixture of sand and water occupying about 20% of the volume of the porcelain jar. The golf balls are tumbled in the jar for 8 hours on a ball mill, then removed and evaluated for adhesion of the indicium. At least about 50 percent, preferably at least about 70 percent, and most preferably at least about 80 percent of the surface area of the indicium, remains. An adhesion of at least about 50 percent of the indicium after this test is considered to render the surface suitable for use in competitive play.

One or more primer coats can be positioned between the game ball cover and any indicia. Furthermore, one or more top coats can be positioned over the indicia.

In embodiments of the disclosure, one or more indicia can be applied directly to the cover of a one-piece, a two-piece, or a multi-piece golf ball. Typically, a golf ball can have between 1 and 7 layers.

In some embodiments of the disclosure, a primed but unfinished golf ball is obtained. Ball 8 in FIG. 1 includes, for example, a core 10, and a durable cover layer 12 having a dimpled surface. Alternatively, the core and cover can be formed in one piece. These layers are representative of an unfinished golf ball.

Figure 1:
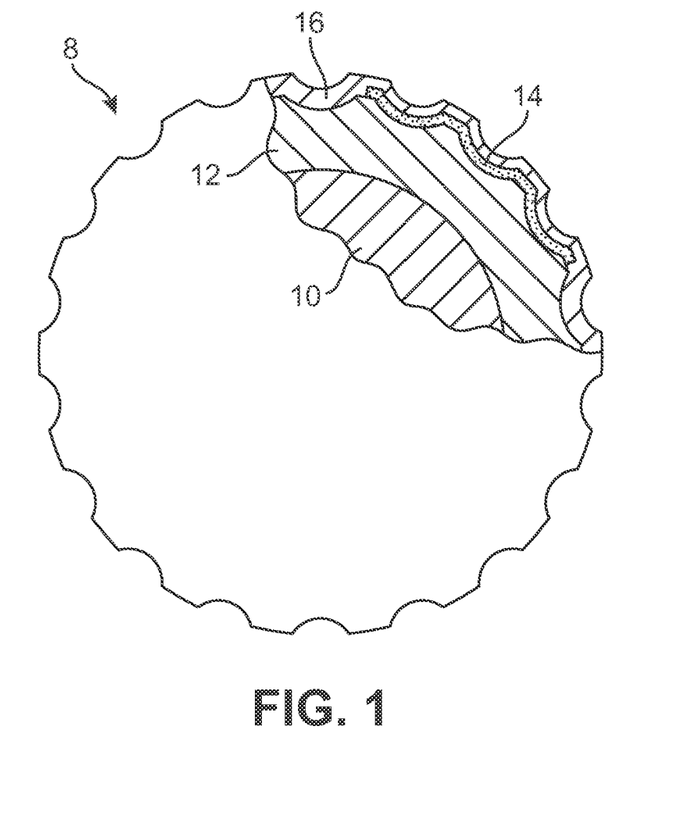
FIG. 1 illustrates a cut-away view of a game ball having an ink indicium cured with visible light according to embodiments of the disclosed technology.

In some embodiments of the disclosure, an unfinished golf ball is made by forming a core 10 and then forming a durable cover layer 12 essentially surrounding the core 10. Alternatively, a one-piece golf ball is formed with a durable cover layer 12. An indicium is pad printed on golf ball cover layer 12. The ink indicium can either be stamped directly on cover layer 12 or can be stamped on a primer which is placed over cover layer 12. The unfinished golf ball with uncured ink composition thereon then is subjected to visible light treatment under conditions sufficient to commence curing of the ink composition to form cured indicium 14. After photoinitiation, curing of the ink is substantially complete within a period of between about less than one second and about a few seconds.

Figure 2:
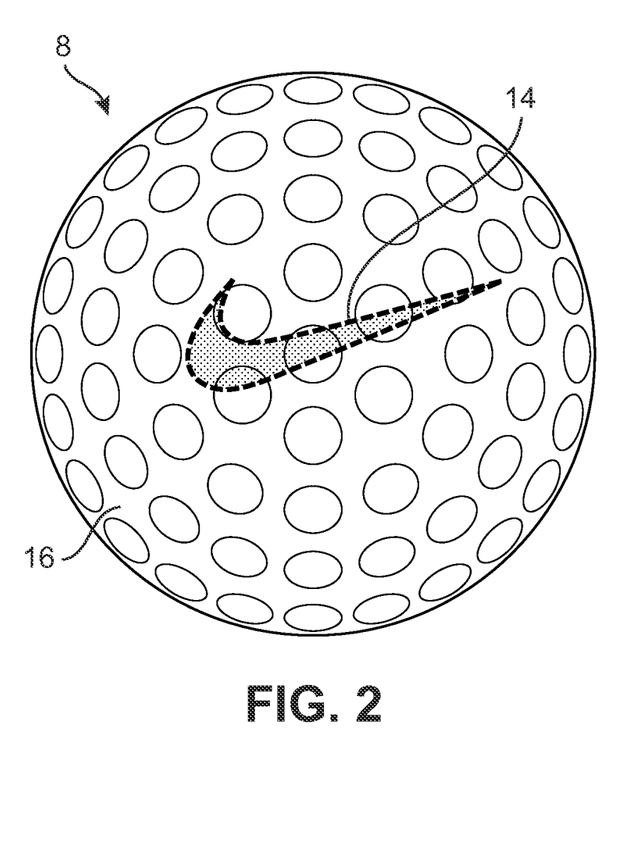
FIG. 2 is a view of the surface of a game ball having an ink indicium cured with visible light according to embodiments of the disclosed technology.

FIG. 2 illustrates golf ball 8 having indicium 14 on the surface of the cover layer covered with top coat layer 16.

Figure 3:
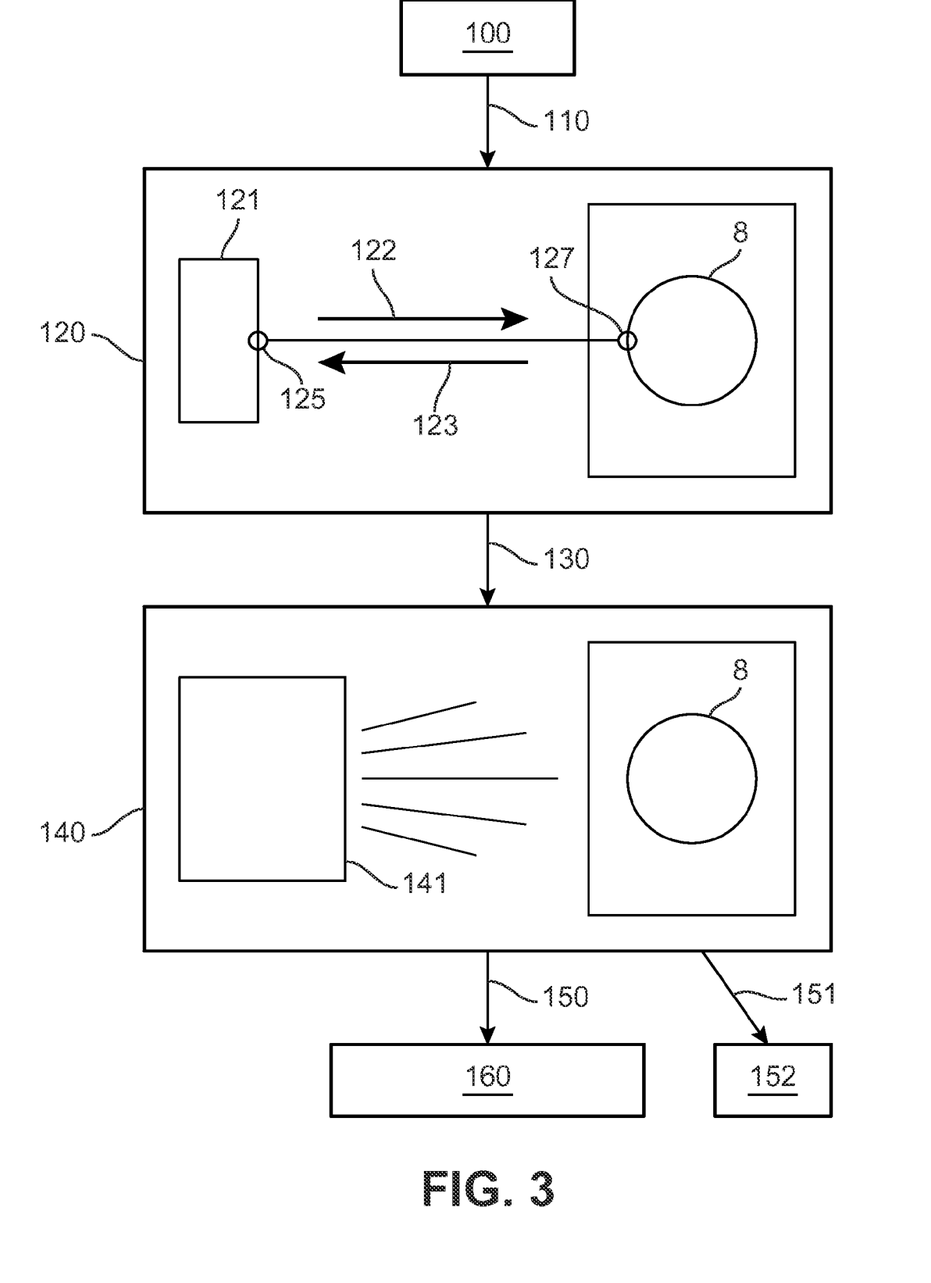
FIG. 3 illustrates a schematic flow chart of a method according to embodiments of the disclosed technology.

FIG. 3 illustrates a schematic flow diagram for apparatus used in a method of marking a golf ball. Ball 8 (not shown) is formed at 100 in accordance with disclosure herein. Ball 8 is moved in the direction of arrow 110 to printing station 120. Pad 121 in position 125 first is inked, then is moved in direction 122 to contact ball 8 and deposit indicium 114 (not shown) on ball 8 at position 127. Pad 121 then is moved in direction 123 until pad 121 is restored to position 125. The pad is again inked and another ball 8 is placed at position 127, and the printing cycle is repeated. The printing pad may comprise a rotatable disc with plural images of the indicium placed serially along the edge of the disc. The pad is rotated at a speed that matches an indicium image with a golf ball to place the ink on the golf ball as each golf ball is presented. Each image on the rotating pad is inked before again contacting a golf ball.

Ball 8 with uncured indicium 114 printed on it is moved in the direction of arrow 130 to curing station 140. Due care should be taken during the movement of ball 8 to ensure that the uncured indicium 114 is not smeared or otherwise damaged. At curing station 140, uncured indicium 114 is exposed to intense visible light from light source 141 including a wavelength between about 400 nm and about 690 nm, the specific wavelength being selected according to the photoinitiating component in the uncured ink. Light source 141 may have one or more LED lights arranged in series or in parallel such that a focal point of emitted light is the printed indicium The intense light cures the ink composition of indicium 114 to form cured indicium 14. A reflector arrangement also can be used to intensify the light onto the indicium.

After appropriate curing conditions, ball 8 with cured indicium 14 thereon can be considered complete and is moved in the direction of arrow 151 to station 152. Alternatively, after appropriate curing conditions, ball 8 with cured indicium 14 thereon is moved in the direction of arrow 150 for further processing, such as application of a topcoat, at station 160.

In embodiments of the disclosure, the golf ball may be further processed by placing a top coat layer 16 over cured ink indicium 14. Top coat layer 16 assists in keeping the indicium on the golf ball surface, as indicated above, and therefore the adhesion of the indicium to the golf ball does not need to be as strong as would be required if the ink were to constitute the outer layer of the ball. Top coat layer 16 typically has a thickness of about 10 microns to about 40 microns.

The following example illustrates some features of this disclosed technology.

EXAMPLE

A golf ball printing ink composition was prepared with:

| Material | Quantity, parts by weight |
| --- | --- |
| CN965A80[1] | 100 |
| IRGACURE ® 819 | 10 |
| Red dispersion[3] | 20 |
| Solvent Naphtha | 50 |

[1]An aliphatic polyester-based urethane diacrylate oligomer in tripropylene glycol diacrylate, obtained from Sartomer USA, LLC (Exton, PA).
2. Bis(2,4,6-trimethylbenzoyl)-phenylphosphine oxide, obtained from BASF Corporation (Wyandotte, MI).
[3]A dispersion of 65 parts by weight of SICO ® Fast Red L 3855 in 35 parts by weight tripropyleneglycol diacrylate.

The components are blended together to form the ink composition. A silicone pad is used to transfer the ink composition in a design to unprimed cover of a golf ball.

The golf ball with the stamped indicium is cured with a 10 watt-LED light having a wavelength centered at 405 nm. The indicium was exposed to radiation from the LED light for about one minute. Several MEK wipes caused some disturbance of the ink, but ink remained on the ball.

While various embodiments of the invention have been described, the description is intended to be exemplary, rather than limiting and it will be apparent to those of ordinary skill in the art that many more embodiments and implementations are possible that are within the scope of the invention. For example, a different ink oligomer; a different monomer thinner, or a solvent; or a different photoinitiator, can be used in embodiments of the disclosure. Accordingly, the invention is not to be restricted except in light of the attached claims and their equivalents. Also, various modifications and changes may be made within the scope of the attached claims.

What is claimed is:

1. A method of applying an indicium to an article of sports equipment, comprising
   (a) printing an ink in the form of an indicium on the article, wherein the ink comprises a free radical-curable material, a colorant, and a photoinitiating component comprising photoinitiator consisting of a member selected from the group consisting of
      (i) compounds that absorb light in both the ultraviolet region and in a range of from about 400 nm to about 690 nm in the visible light region of the electromagnetic spectrum to generate free radicals and combinations thereof;
      (ii) Type I photoinitiator compounds and Type II photoinitiator compounds containing an abstractable hydrogen that absorb light in a range of from about 400 nm to about 690 nm in the visible light region of the electromagnetic spectrum to generate free radicals and combinations thereof;
   and combinations thereof;
   (b) partially curing the printed indicium with one or more LED lights that emit visible light having a wavelength absorbed by the photoinitiator to obtain a partially cured, printed indicium on the article;
   (c) applying a clear top coat over the printed indicium, and
   (d) further curing the printed indicium through the clear top coat with one or more LED lights that emit visible light having a wavelength absorbed by the photoinitiator to obtain a cured, printed indicium on the article, wherein the ink has a Sward hardness (ASTM D 2134-66) of no more than about 40 after curing.

2. A method according to claim 1, wherein the article of sports equipment is selected from the group consisting of game balls, golf clubs, bats, and sticks, wherein the impact resistance of the cured ink and the adhesion between the indicium and the surface after curing are sufficient to render the surface suitable for use in competitive play.

3. A method according to claim 1, wherein the article of sports equipment is a game ball.

4. A method according to claim 1, wherein the ink is printed by pad printing, screen printing, gravure printing, or ink jet printing.

5. A method according to claim 1, wherein the one or more LED lights are arranged in series or in parallel such that a focal point of emitted light is the printed indicium.

6. A method according to claim 1, wherein the initiator is a Type II initiator and the ink further comprises a compound that acts as a hydrogen donor for a Type II photoinitiator.

7. A method according to claim 1, wherein the photoinitiator consists of a member selected from the group consisting of
   (ii)(A) 3 to 13 wt % Type I photoinitiator compounds that absorb light in a range of from about 400 nm to about 690 nm in the visible light region of the electromagnetic spectrum to generate free radicals and combinations thereof;
   (ii)(B) Type II photoinitiator compounds containing an abstractable hydrogen that absorb light in a range of from about 400 nm to about 690 nm in the visible light region of the electromagnetic spectrum to generate free radicals and combinations thereof used in combination with at least one co-initiator;
   and combinations thereof.

8. A method of applying an indicium to an article of sports equipment, comprising
   (a) printing an ink in the form of an indicium on the article, wherein the ink comprises a free radical-curable material, a colorant, and a photoinitiating component comprising photoinitiator consisting of a member selected from the group consisting of
      Type I photoinitiator compounds and Type II photoinitiator compounds containing an abstractable hydrogen that absorb light in a range of from about 400 nm to about 690 nm in the visible light region of the electromagnetic spectrum to generate free radicals and combinations thereof;
   (b) partially curing the printed indicium with one or more LED lights that emit visible light having a wavelength absorbed by the photoinitiator to obtain a partially cured, printed indicium on the article;

(c) applying a clear top coat over the printed indicium, and (d) further curing the printed indicium through the clear top coat with one or more LED lights that emit visible light having a wavelength absorbed by the photoinitiator to obtain a cured, printed indicium.

9. A method according to claim 8, wherein the photoinitiator consists of a member selected from the group consisting of (ii)(A) 3 to 13 wt % Type I photoinitiator compounds that absorb light in a range of from about 400 nm to about 690 nm in the visible light region of the electromagnetic spectrum to generate free radicals and combinations thereof;

(ii)(B) Type II photoinitiator compounds containing an abstractable hydrogen that absorb light in a range of from about 400 nm to about 690 nm in the visible light region of the electromagnetic spectrum to generate free radicals and combinations thereof used in combination with at least one co-initiator;

and combinations thereof.

* * * * *